July 27, 1937.  C. P. GESNER  2,087,887
LIQUID FILTER AND COOLER
Filed May 16, 1934   2 Sheets-Sheet 1
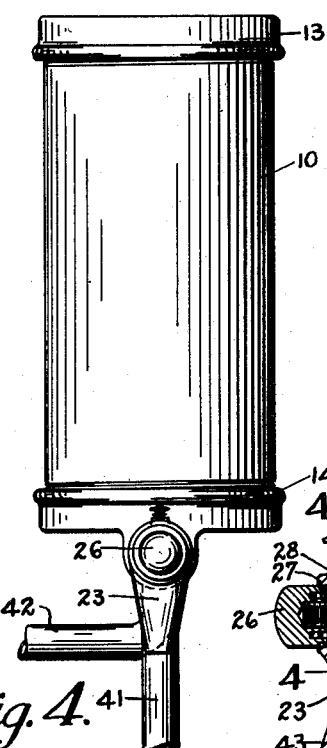
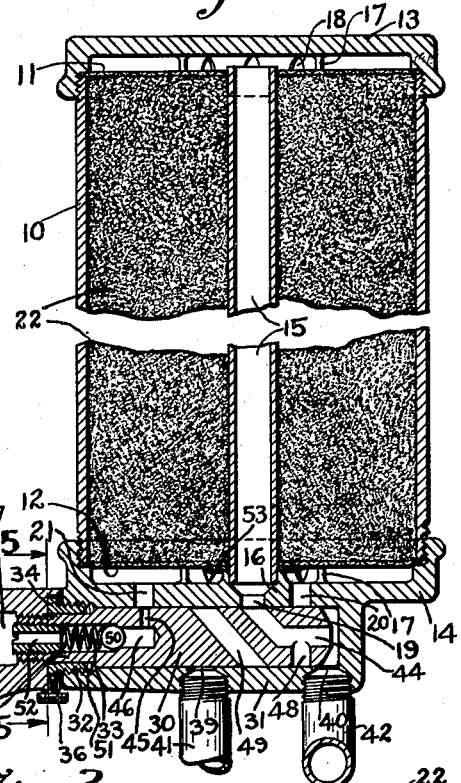
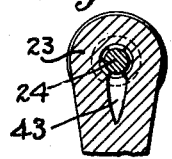
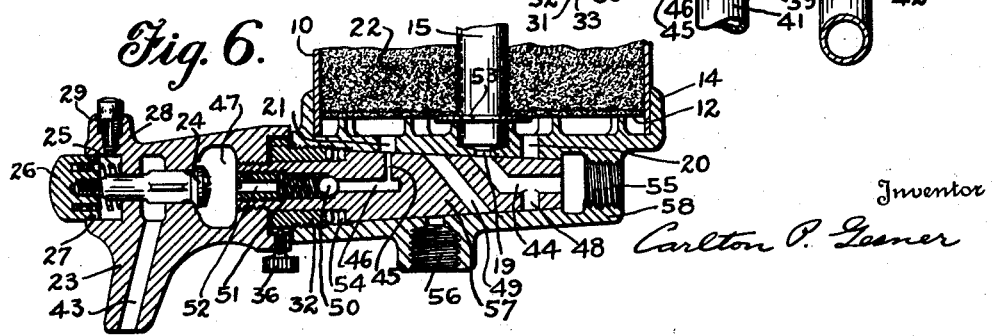
Inventor
Carlton P. Gesner
By Walter S. Edwards
his Attorney July 27, 1937.  C. P. GESNER  2,087,887
LIQUID FILTER AND COOLER
Filed May 16, 1934  2 Sheets-Sheet 2
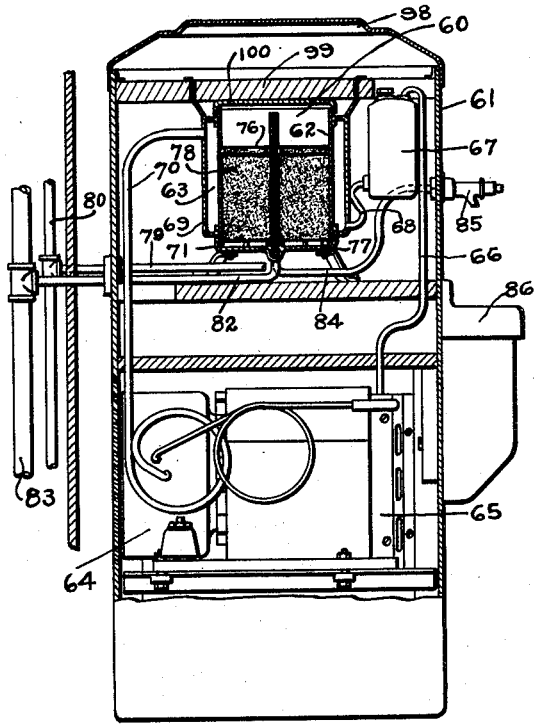
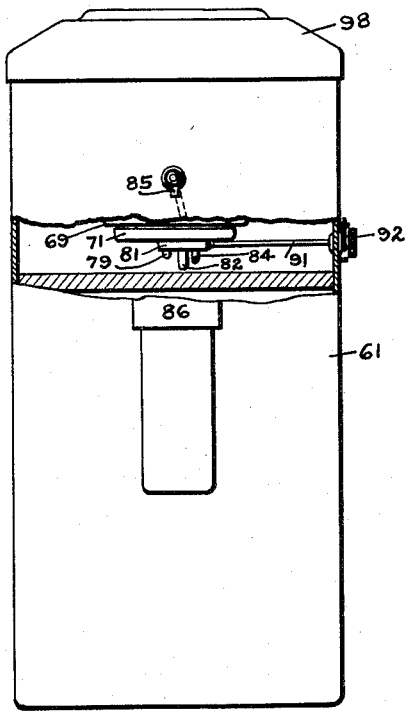
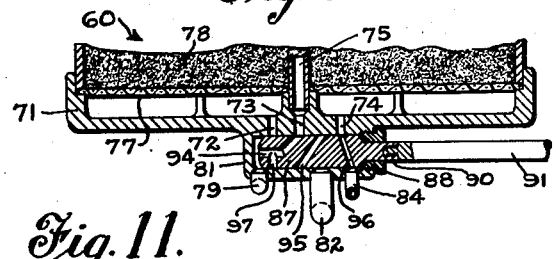
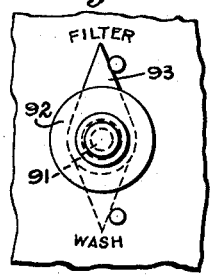
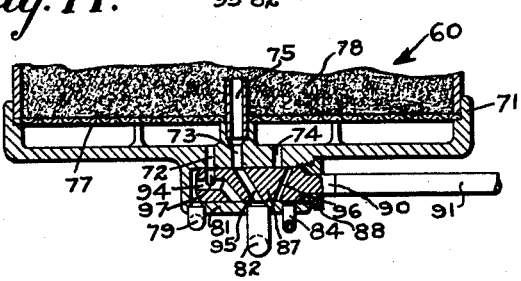
Inventor
Carlton P. Gesner
By Walter S. Edwards
his Attorney Patented July 27, 1937

2,087,887

UNITED STATES PATENT OFFICE 2,087,887

LIQUID FILTER AND COOLER

Carlton P. Gesner, New Haven, Conn.

Application May 16, 1934, Serial No. 725,849

6 Claims. (Cl. 210—77)

This invention relates to the art of liquid filtration and more particularly to a liquid filter, per se, and in combination with a cooler therefor.

Liquid filters of various forms have been in use for a number of years but no one of them has enjoyed universal acceptance by the public and come into general use. This is due to various disadvantages, the principal one being the necessity of recharging the filter with fresh filtering material or of dismantling the filter to clean its parts at frequent intervals in order to obtain even normal efficiency of operation. A filtering material, commonly known as decolorizing or activated carbon, has more or less recently come into general use for liquid filtration in large installations such as water works, bottling works and distilleries. A peculiarity of this material is that it is high in carbon content, dense and hard, thus giving it very long life for liquid purification work, as it does not dissolve or readily disintegrate, and that in water filtration work it removes substantially all organic matter, algae and their spores, reduces iron and any corrosive substance in the water, as well as removing odors and taste.

Another peculiarity of this material is that after continuous use for a period of time it may be readily cleansed either by washing or by the application of heat and subsequently be substantially efficient in its filtration action for another period of time.

One of the objects of this invention is to provide a liquid filter of such structure that the advantages desired will be obtained and which may be readily operated and substantially continuously efficient.

Another object of this invention is to provide a liquid filter in the structure of which is included liquid flow control means whereby the filtering material may be properly and efficiently cleansed in a convenient and readily operated manner.

Still another object is to provide a combined liquid filter and liquid cooler wherein the liquid flowing therethrough will be efficiently filtered and cooled before use.

A further object is to provide a liquid flow control mechanism for filters of the above type, whereby filtered liquid may be obtained with convenience and despatch and the filtering material may be readily cleansed when desired.

To these and other ends, the invention consists in the novel features and combinations of parts to be hereinafter described and claimed.

In the accompanying drawings:

Fig. 1 is an elevation of a liquid filter, embodying the features of this invention;

Fig. 2 is an enlarged vertical section of the filter shown in Fig. 1;

Fig. 3 is a partial section, showing another position of a liquid flow control means;

Fig. 4 is a section on line 4—4 of Fig. 2;

Fig. 5 is a section on line 5—5 of Fig. 2;

Fig. 6 is a partial vertical section of a slightly modified form of flow control means;

Fig. 7 is a vertical section through a combined liquid filter and cooler;

Fig. 8 is a partial section of the same;

Fig. 9 is a partial section through the liquid filtering means of such a combination to show the liquid flow control mechanism;

Fig. 10 is a partial section similar to Fig. 9, but showing the control mechanism in another position, and Fig. 11 is a partial side view of the combined liquid filter and cooler to show the indicating means for the liquid control means.

The embodiment illustrated in the drawings is of a liquid filter primarily adapted to use activated or decolorizing carbon as the filtering material. This material as used in filters of this nature, is in granular form and in this instance is loosely disposed in a container shell 10, between discs 11 and 12. A top cap 13 is provided for the container shell 10, which, when removed, permits access to the interior of the latter to facilitate assembly of the filtering material and screens therein.

A lower cap 14 is also provided which may be removably secured to the lower end of container shell 10, if desired, or it may be permanently sealed thereto. A tube 15 is seated in a recessed boss 16 formed on the upper surface of cap 14 and extends upwardly therefrom through the shell 10, and the filtering material therein, with its upper end above the screen 11 and slightly below the undersurface of top cap 13. An annular flange 17 extends inwardly from each cap into contact with the adjacent screen 11 or 12 to support the center portion of same. Notches 18 are provided in these flanges to permit the flow of liquid therethrough and to spread and direct the liquid substantially equally in all directions over the exposed surface of the filtering material. An opening 19 is provided in cap 14 in communication with the interior of tube 15, and openings 20 and 21 are also provided in cap 14 in communication with the interior of shell 10.

In the filter shown in the drawings, the liquid flow, when the same is being filtered, is upwardly through opening 19, tube 15, then through screen 11, a body of filtering material 22, which is preferably activated carbon in granular form, screen 12, and out of the container, through opening 21. A faucet 23 is provided having a valve 24 normally retained closed by means of a spring 25 and operable against spring pressure by means of a button 26. The button 26 is provided with an annular recess 27 into which may be disposed a pin 28 to retain it and the valve in open position. The pin 28 is normally retained out of engagement with the button 26 by means of a spring 29.

Secured to faucet 23 is a liquid flow directing member or stem 30 which, in this instance, is cylindrical and extends rearwardly from the faucet 23 and into a casing 31, disposed upon the lower cap 14. The stem 30 is secured within, and the faucet 23 is secured to the casing 31 by means of a stuffing box gland nut 32, the gland 33 compressed thereby preventing liquid leakage from between the stem and the casing interior. The gland nut 32 is provided with a head 34, which is serrated about its periphery as shown at 35, see Fig. 5 whereby the faucet 23 may be locked thereto against relative rotation therewith by a thumbscrew 36, which has a pointed end 37 adapted to fit into any one of the serrations 35. The stem at its reduced portion 38, is free to rotate in the gland nut 32 and is tightly threaded into the faucet 23. By loosening thumbscrew 36 the faucet 23 and stem 30 may be rotated relatively to the gland nut 32 and casing 31, for a purpose to be hereinafter described.

The casing 31 is provided with ports 39 and 40 into which tubes or pipes 41 and 42 may be respectively threaded. The pipe 41 is provided for use as a drain or waste pipe, while the pipe 42 is for connection with a source of liquid supply, for instance, a water supply line. The stem 30 is provided with a plurality of passages arranged to selectively connect into communication the ports 39 and 40 and the faucet discharge opening 43 with the openings 19, 20 and 21, provided in cap 14 as desired by the rotation of the stem relatively to the casing. For instance, referring to Fig. 2, through a passageway 44 the liquid supply inlet 40 is in communication through opening 19 with the tube 15, directing the incoming liquid to the top of the container for discharge above the screen 11, and a passageway 45 connects the opening 21 into communication with a passageway 46 leading into a valve chamber 47 in faucet 23 from which liquid may be drawn by operation of valve 24, and discharged from passageway 43. It will be obvious that while flowing from the inlet 40 the liquid will compact the granular material 22 and filter downwardly therethrough and be acted upon thereby.

After considerable liquid has been filtered and it is desired to cleanse the filtering material, the thumbscrew 36 is loosened and the faucet 23 with stem 30 is rotated into the position shown in Fig. 3. In this instance, the inlet passage 40, by means of a bypass 48, is connected into communication with opening 20 in the lower cap 14 and the passage 44 is disconnected from communication with opening 19. At the same time, the drain or waste outlet 39 is connected into communication with the opening 19 by a passageway 49, and the passageway 45 is disconnected from the opening 21. The obvious flow of liquid in this latter instance, is, therefore, from the inlet 40 through passageway 48, opening 20 and upwardly through the filtering material 22, and then downwardly through tube 15, passageway 49, port 39 and discharged through pipe 41.

When cleansing or washing the filtering material full pressure of the liquid from its supply is desired, in order to disturb and force out all foreign matter filtered from the liquid and to agitate the loosely packed carbon granules to clean the surfaces thereof, but when filtering, it is desirable that the flow be controlled to a known volume for a predetermined period of time. Control means for this purpose has been provided and comprises a spring pressed ball 50, spring 51 and an adjusting sleeve 52 threaded into the end of the stem 30 where the latter engages the faucet 23. Adjustment of spring tension by means of sleeve 52 will vary the rate of flow whereby a constant rate of filtering will be obtained regardless of the particular liquid pressure encountered where the filter is installed. When cleansing the filtering material by the arrangement shown in Fig. 3, the normal rate of flow of the liquid being filtered as it enters the filter, is used, without reduction, in order to get a forceful flow.

The lower screen 12 is removable with tube 15 by resting upon a washer 53 which is permanently secured to tube 15. When it becomes desirable to change the filtering material 22, the top cap 13 is removed and the contents may then be lifted out by raising tube 15. The washer 53, as illustrated, overlies the part 25 whereby it acts as a baffle to break the force of the liquid flowing upwardly and to spread the same transversely with respect to the direction of its flow.

In the modified form shown in Fig. 6, the flow control means includes a member 57 that is similar to member 30, except that it is tapered and is held into tight engagement with the casing 58, by means of a spring 54. The spring 54 acts against the large end of the taper of member 57 and against the gland nut 32 to force the member 57 axially. An inlet port 55 is provided in the end and a wash drain outlet 56 in the bottom of the casing 58.

Figs. 7 to 11 inclusive, illustrate the provision of cooling means for a filter of the above structure. In this instance, the filter 60 is disposed in the upper section of a cabinet 61 with the outer wall of its shell 62 being surrounded by a body of refrigerant fluid 63, or the like. The cooling means generally comprises any well known type of electric refrigerator mechanism and includes a motor driven operating unit 64 having the usual condenser 65, which is connected by a tube 66 to the usual control mechanism 67. From the control mechanism 67 the refrigerant 63 is directed by a pipe 68 into a space about shell 62 formed by a jacket 69. From the jacket 69 the refrigerant returns to the operating unit 64 through pipe 70.

The structure and operation of the filter 60 is in most respects the same as the one illustrated in Figs. 1 to 5, inclusive. In this instance, however, a slightly modified form of liquid flow control means is provided. The bottom cap 71 of the filter is provided as in the previous form with openings 72, 73 and 74 and a tube 75 extends upwardly from opening 73 to a position above the upper screen 76. A lower screen 77 is also provided and a body of filtering material 78, preferably activated carbon, is disposed between screens 76 and 77.

An inlet pipe 79 connected to a liquid supply main 80 is in communication with the interior of a casing 81, disposed upon the bottom cap 71. A waste or drain pipe 82 connected to a waste main 83 is also in communication with the interior of casing 81. A pipe 84, connects the interior of casing 81 with a discharge faucet 85 mounted upon one side of the cabinet 61. A suitable drip basin 86 is provided and disposed below faucet 85. A liquid flow directing member 87 corresponding to the stem 30 is disposed in casing 81 and is rotatable relatively thereto. A stuffing box gland nut 88 threaded into an end of casing 81 retains member 87 in said casing against liquid leakage. An extension 90 of member 87 is threadingly engaged by an operating rod 91 which extends through the cabinet 61 to the exterior of a side thereof. An operating handle 92 is secured to rod 91 exteriorly of said cabinet side. The handle 92 is provided in this instance with a pointer 93 associating with indicia disposed upon the cabinet to indicate the position of member 87 relative to casing or cabinet 61.

The member 87 is provided with passageways or ducts 94, 95, 96 and 97 that substantially correspond in form and use with passageways 44, 49, 45 and 48, respectively. The liquid enters casing 81 through pipe 79, flows through duct 94, opening 73, tube 75 to the top of filter 60 and then filters downwardly through the filtering material 78 and out through opening 74, duct 96 into pipe 84 and then to faucet 85 when the member 87, by operation of rod 91, is disposed in position as shown in Fig. 8. When the member 87 is in this position, the filter is in operation and the indicating pointer 93 indicates "filter", that is, that filtration of the liquid is possible. When the member 87 is rotated by handle 92 through rod 91 into the position shown in Fig. 9, the pointer 93 indicates "wash" and in this instance, the filtering material is being cleansed due to the liquid flow being from pipe 79 into casing 81, through duct 97, opening 72 upwardly through filtering material 78, downwardly through tube 75, opening 73, through duct 95 and out through drain pipe 82.

While filtering liquid by the arrangement of parts shown in Figs. 7 to 11 inclusive, the cooling, such as above described, is automatically operated to maintain the filter 60 and the liquid contained therein at a predetermined and constant temperature, insuring pure, cooled water in the case where the liquid being filtered is water. The removal of a cabinet top 98, interior cover 99 and filter top cap 100, facilitates the assembly of the filter parts or the change of filtering material whenever the same is desired.

By the provision of a filter of the above described structure, liquids may be filtered efficiently through granular filtering material and especially filtering material having the characteristics of activated or decolorizing carbon, without the disadvantage, expense and inconvenience of frequent replacement of such material. By the use of activated carbon it has been found that under normal conditions and use and by an occasional cleansing, the filtering material will continue to efficiently operate to filter liquids for at least a year. A comparatively large saving of expense and time is, therefore, occasioned by the use of the filter of this invention. The combination of features, including the filter with the liquid flow control means described above, permits the efficient use of activated carbon as a filtering material and the inclusion of liquid cooling means in such a combination permits a user to obtain from the local mains, at nominal expense, filtered water substantially equal in quality to distilled water and generally more palatable.

While I have shown and described a preferred embodiment of my invention, it is to be understood that the same is not to be limited to all of the details shown, but is capable of modification and variation within the spirit of the invention and the scope of the appended claims.

What I claim is:

1. In a liquid filter, a container having filtering material therein, said filter having an inlet, an openable faucet outlet and a waste outlet, means connected to said faucet and rotatable thereby to selectively direct liquid from the inlet to said faucet outlet in one direction and from the inlet to said waste outlet in the reverse direction through said material, adjustable means to vary the rate of flow to said faucet outlet, means to open and close said faucet outlet, and means to lock said last named means in open position.

2. In a liquid filter, a container, a mass of granular activated carbon in said container, an inlet passageway to the upper surface of said mass of carbon, an inlet port beneath the lower surface of said carbon, an outlet port beneath the lower surface of said carbon, an openable faucet outlet for said filter, a waste outlet for said filter, means connected to said faucet for actuation thereby to selectively direct liquid through said inlet passageway and through said inlet port, said means connecting said outlet port with said faucet outlet for said filter when directing liquid through said passageway, said means connecting said passageway with said waste outlet when directing liquid through said inlet port, and means to vary the rate of flow of liquid through said carbon when it is directed out of said outlet port.

3. In a filter for liquids, a container having filtering material therein, a casing, means to selectively direct liquid through said material in reverse directions, said means comprising a member rotatably mounted in said casing, an operating member secured to one end of said rotatable member whereby to rotate the same, a gland nut threadingly engaging said casing to retain said member therein, and means carried by said operating member to engage said gland nut to remove the same.

4. In a filter for liquids, a container having filtering material therein, a casing, said casing having an inlet, an outlet and a waste outlet means to selectively direct liquid through said material from the inlet to said outlet in one direction, and from the inlet to said waste outlet in the reverse direction, said means comprising a member rotatably mounted in said casing, a faucet member in connection with said outlet and secured to one end of said rotatable member whereby to rotate the same, means to open said faucet to permit liquid to flow therethrough, means to lock said faucet opening means in open position, an outlet port in said faucet and a passageway in said rotatable member, and adjustable means disposed between the outlet port in said faucet and the passageway in said member to vary the rate of flow of liquid from one to the other.

5. In a liquid filter, a container having activated carbon therein, a casing at the bottom of said container, a passageway through said container to the upper surface of said carbon, an inlet port and an outlet port in the bottom of said container, a member rotatably mounted in said casing, an inlet port and an outlet port in said casing, passageways in said rotatable member to selectively connect said ports in said casing with said passageway through said container and said inlet port in said casing with the inlet port in said container, a passageway in said member connecting with said outlet port in said container, an openable faucet in connection with said last named passageway in said member, adjustable means between said faucet and said last named passageway to vary the rate of flow of liquid therethrough, said faucet being secured to said member to rotate the same to selectively cause liquid to flow downwardly through said carbon at a controlled rate of flow and upwardly through said carbon at an uncontrolled rate of flow.

6. In a liquid filter, a container having filtering material therein, an inlet to direct the flow of liquid entering said container to one side of said filtering material, an inlet to direct the flow of liquid to the other side of said filtering material, an outlet port, an openable discharge member, adjustable means to control the rate of flow of the liquid through said discharge member when said member is open, a drain passage, a flow direction control member operable by said discharge member, said flow direction control member having passageways therein whereby liquid may be selectively directed first to one of said inlets and to said discharge member and then to the other of said inlets and to said drain passage.

CARLTON P. GESNER.